June 7, 1960  H. H. WOLFF ET AL  2,939,796
SINTERED HARD ALLOYS
Filed Feb. 11, 1958
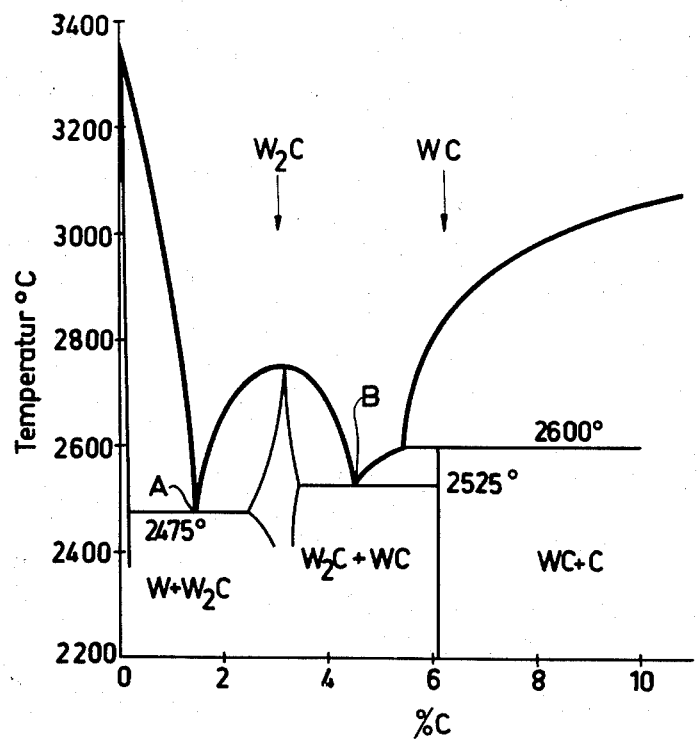
HANS HERMANN WOLFF
and         INVENTORS
SWEN TORSTEN LENNART PETTERSSON
BY
ATTORNEY.

United States Patent Office 2,939,796
Patented June 7, 1960

2,939,796

SINTERED HARD ALLOYS

Hans Hermann Wolff and Sven Torsten Lennart Pettersson, Soderfors, Sweden, assignors to Stora Kopparbergs Bergslags Aktiebolag, Falun, Sweden Filed Feb. 11, 1958, Ser. No. 714,614

Claims priority, application Sweden Nov. 15, 1957

5 Claims. (Cl. 106—43)

This invention relates to sintered hard alloys.

Recently a cutting material consisting of or containing ceramic oxides has appeared on the market, consisting substantially of aluminum oxide and specially adapted for use in cutting tools or bits. This material has proved to be capable of partly replacing the so-called hard metal carbides and, particularly at high cutting speeds, it has surpassed them in performance. The suitability of such products for cutting work depends to an essential degree on their low thermal conductivity and their high strength or hardness at elevated temperatures, respectively.

It is also known that such cutting material can be manufactured from a mixture consisting essentially of aluminum oxide and metal carbides such as molybdenum carbide $Mo_2C$ and tungsten carbide WC. Difficulties are however encountered in the manufacture of bodies from mixtures of carbides and oxides, chiefly on account of low sintering capacity, so that the resulting bodies will be unhomogeneous and porous.

According to the present invention it has now been found in a surprising manner that the above-mentioned disadvantages in the manufacture of oxide-carbide bodies can be eliminated by making up the carbide from a mixture of WC and $W_2C$ in a eutectic ratio. It is not necessary, however, to produce the mixture from $W_2C$ and WC, the same effect being attainable if WC and tungsten, or tungsten and carbon are used in a ratio as will give the said eutectic structure. The eutectic is developed in the course of the sintering process, whereby the sintering capacity is still further increased by the simultaneous occurrence of the phase transformation.

The hard alloy according to the invention consequently consists of a sintered mixture of aluminum oxide and the tungsten carbides $W_2C$ and WC in eutectic ratio, possibly together with minor admixtures of, for example, between .1 and 10 percent by weight of other high-melting oxides such as magnesium oxide and/or quartz.

The addition of magnesium oxide or quartz or a mixture of both, lowers the sintering temperature of the alloy and acts as bonding agent in the sintered alloy.

In order also to make the alloy resistive to formation of so-called craters at the tip of bits of such alloys used as lathe tool, minor quantities of carbides other than tungsten carbides can be used. Especially appropriate in this respect are admixtures of from 5 to 15 percent by weight of carbides of metals from the 5th group of the periodic system, such as columbium carbide, tantalum carbide or vanadium carbide. The total contents of metal carbides should, for example, amount to at least 40 percent by weight.

The manufacture of the hard alloys described above is carried out by mixing and grinding in a ball mill the pulverulent ingredients together with a liquid, for example alcohol, methylene chloride, etc. The powder so formed may then be mixed with paraffin wax, or comparable material, and the resultant mixture pressed into the desired body shape, which bodies are then subjected to presintering at a temperature of about 1000° C. for a period of about one hour. The presintered bodies are then pressed into their final shape in which they are subjected to the sintering process proper. This process may take place either in an inert, or reducing atmosphere, or in a vacuum. The temperature at which it is carried out is in the range of about 1600–1650° C. for 1–3 hours, preferably about 2 hours. During this sintering a shrinkage of about 50% by volume takes place.

The bodies manufactured in this way are characterised by splendid density and tightness and homogeneous structure. They can be used to great advantage as parts of cuttings tools or bits, for example for lathe tools, and as a protective against wear.

Examples of compositions of hard alloys according to the invention are given below, the percentage values indicate weight proportions.

(1) 60.0% $W_2C$+WC in eutectic composition
    36.4% $Al_2O_3$
    1.8% MgO
    1.8% $SiO_2$ (2) 43.0% $W_2C$+WC in eutectic composition
    5.0% NbC
    47.5% $Al_2O_3$
    2.3% MgO
    2.2% $SiO_2$ (3) 55.0% $W_2C$+WC in eutectic composition
    8.0% TaC
    33.4% $Al_2O_3$
    1.8% MgO
    1.8% $SiO_2$ (4) 29.0% WC
    26.0% $W_2C$
    5.0% TaC
    3.0% NbC
    33.4% $Al_2O_3$
    1.8% MgO
    1.8% $SiO_2$ The accompanying drawing shows a diagram of tungsten-compositions in various melts. The percentage by weight of carbon has been set out on the horizontal axle and temperatures in ° C. on the vertical axis. It will be seen from the diagram that the curve has two eutectic points A and B, of which A refers to the eutectic between W and $W_2C$, and B between $W_2C$ and WC. It is the last-mentioned eutectic which is referred to in the present invention. The eutectic (melting) point is here 2525° C. and sintering may be effected at a low temperature in the range of 1600 to 1650° C.

Since certain changes may be made in the above composition of matter and different embodiments of the invention could be made without departing from its scope, it is intended that all matter contained in the above description shall be interpreted as illustrative and not in a limiting sense.

What we claim is:

1. A hard sintered powder-metallurgical material consisting of a sintered mixture composed of the two tungsten carbides $W_2C$ and WC in eutectic ratio, and a balance of substantially all aluminum oxide, said carbides being present in not less than 40% by weight of the total.

2. A hard sintered powder-metallurgical material consisting of a sintered mixture composed of the tungsten carbides $W_2C$ and WC in eutectic ratio, magnesium oxide, and a balance of substantially all aluminum oxide, said carbides being present in not less than 40% by weight and said magnesium oxide being present in from .1%–10% by weight.

3. A hard sintered powder-metallurgical material consisting of a sintered mixture composed of the tungsten carbides $W_2C$ and $WC$ in eutectic ratio, quartz, and a balance of substantially all aluminum oxide, said carbides being present in not less than 40% by weight and said quartz being present in from .1%–10% by weight.

4. A hard sintered powder-metallurgical material consisting of a sintered mixture composed of the tungsten carbides $W_2C$ and $WC$ in eutectic ratio, a mixture of magnesium oxide and quartz, and a balance of substantially all aluminum oxide, said carbides being present in not less than 40% by weight and said mixture of magnesium oxide and quartz being present in from .1%–10% by weight.

5. A hard sintered powder-metallurgical material formed exclusively of carbides and oxides consisting of a sintered mixture of metal carbides and a balance of substantially all aluminum oxide, said metal carbides being present in not less than 40% by weight, with from 5%–15% of the total of said carbides being a carbide of a metal of the group consisting of vanadium, columbium and tantalum and the remainder of said carbides being a mixture of the tungsten carbides $W_2C$ and $WC$ in eutectic ratio.

References Cited in the file of this patent

UNITED STATES PATENTS

| | | |
|---|---|---|
| 1,981,719 | Comstock | Nov. 20, 1934 |
| 2,113,171 | Cooper | Apr. 5, 1938 |

OTHER REFERENCES

"Refractory Hard Metals," by Swarzkopf et al., page 157, published 1953.